United States Patent
Chen

(10) Patent No.: US 8,203,623 B2
(45) Date of Patent: Jun. 19, 2012

(54) IMAGE CAPTURE DEVICE AND METHOD THEREOF

(75) Inventor: Zheng-Yong Chen, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 782 days.

(21) Appl. No.: 12/251,425

(22) Filed: Oct. 14, 2008

(65) Prior Publication Data

US 2009/0284615 A1   Nov. 19, 2009

(30) Foreign Application Priority Data

May 15, 2008   (CN) .......................... 2008 1 0301590

(51) Int. Cl.
*H04N 9/73* (2006.01)
*H04N 5/235* (2006.01)

(52) U.S. Cl. ................ 348/226.1; 348/229.1; 348/221.1

(58) Field of Classification Search ............... 348/226.1, 348/229.1, 345, 353–356, 221.1
See application file for complete search history.

(56) References Cited

U.S. PATENT DOCUMENTS

| | | | |
|---|---|---|---|
| 6,710,818 B1 * | 3/2004 | Kasahara et al. | 348/607 |
| 7,142,234 B2 * | 11/2006 | Kaplinsky et al. | 348/226.1 |
| 7,705,893 B2 | 4/2010 | Kinoshita | |
| 7,961,250 B2 * | 6/2011 | Hirai et al. | 348/376 |
| 2004/0001153 A1 * | 1/2004 | Kikukawa et al. | 348/226.1 |
| 2004/0165084 A1 * | 8/2004 | Yamamoto et al. | 348/226.1 |
| 2005/0093996 A1 * | 5/2005 | Kinoshita | 348/226.1 |
| 2006/0256208 A1 * | 11/2006 | Ono et al. | 348/227.1 |
| 2008/0062276 A1 | 3/2008 | Hirai et al. | |

FOREIGN PATENT DOCUMENTS

CN   1577040 A   2/2005

* cited by examiner

*Primary Examiner* — Nhan T Tran
*Assistant Examiner* — Tuan Le
(74) *Attorney, Agent, or Firm* — Altis Law Group, Inc.

(57) ABSTRACT

An image capture device to eliminate flicker includes an image detection unit forming consecutive preview images at a predetermined rate, each formed with a group of parameters, and a flicker elimination unit acquiring the exposure count of the preview images, plotting the exposure count to form a waveform, determining whether the exposure count is fluctuating, analyzing the information of the waveform to allow determination of modulation of one of the group of parameters if the exposure count is fluctuating, and modulating one of the group of parameters according to the analysis result.

10 Claims, 5 Drawing Sheets

IMAGE CAPTURE DEVICE AND METHOD THEREOF

BACKGROUND

1. Technical Field

The invention relates to image capture and, particularly, to an image capture device providing image previews with uniform brightness and a method thereof.

2. Description of the Related Art

In general, charge-coupled device (CCD) systems such as video cameras or digital still cameras include a CCD image sensor and a lens module. The CCD image sensor repeats readout of an image signal generated thereby as consecutive preview images at a predetermined rate, such as 30 frames per second (FPS), the system being National Television System Committee (NTSC)-compliant. Problems may result in a CCD system when capture is performed under fluorescent lighting conditions operated at a commercial frequency of 50 Hertz (Hz). As shown in FIG. 5, a graph illustrating autofocus of a common image capture device, horizontal axis represents preview time in milliseconds (ms) and the vertical axis brightness in lux (lx) of such a fluorescent lighting condition. During preview, the CCD image sensor is exposed at a uniform exposure of Yms to acquire consecutive preview images corresponding to different focus conditions of the lens module, such as a focus lens thereof positioned at different focus positions $P_1 \sim P_k$ (in FIG. 5, k being a natural number). As shown, brightness values $L_1 \sim L_k$ of the consecutive preview images are not equal, since the sampling rate of the CCD image sensor (30 Hz) is not compatible with the illuminative frequency of 50 Hz, and flicker results. This can decrease autofocus accuracy if a contrast measurement method is used.

Therefore, it is desirable to provide an image capture device and method thereof, which can overcome the limitations described.

BRIEF DESCRIPTION OF THE DRAWINGS

Many aspects of the present image capture device and method should be better understood with reference to the following drawings. The components in the drawings are not necessarily drawn to scale, the emphasis instead being placed upon clearly illustrating the principles of the present image capture device and method. Moreover, in the drawings, like reference numerals designate corresponding parts throughout the several views.

DETAILED DESCRIPTION OF THE EMBODIMENTS

Embodiments of the present image capture device and method will now be described in detail with reference to the drawings.

Figure 1:
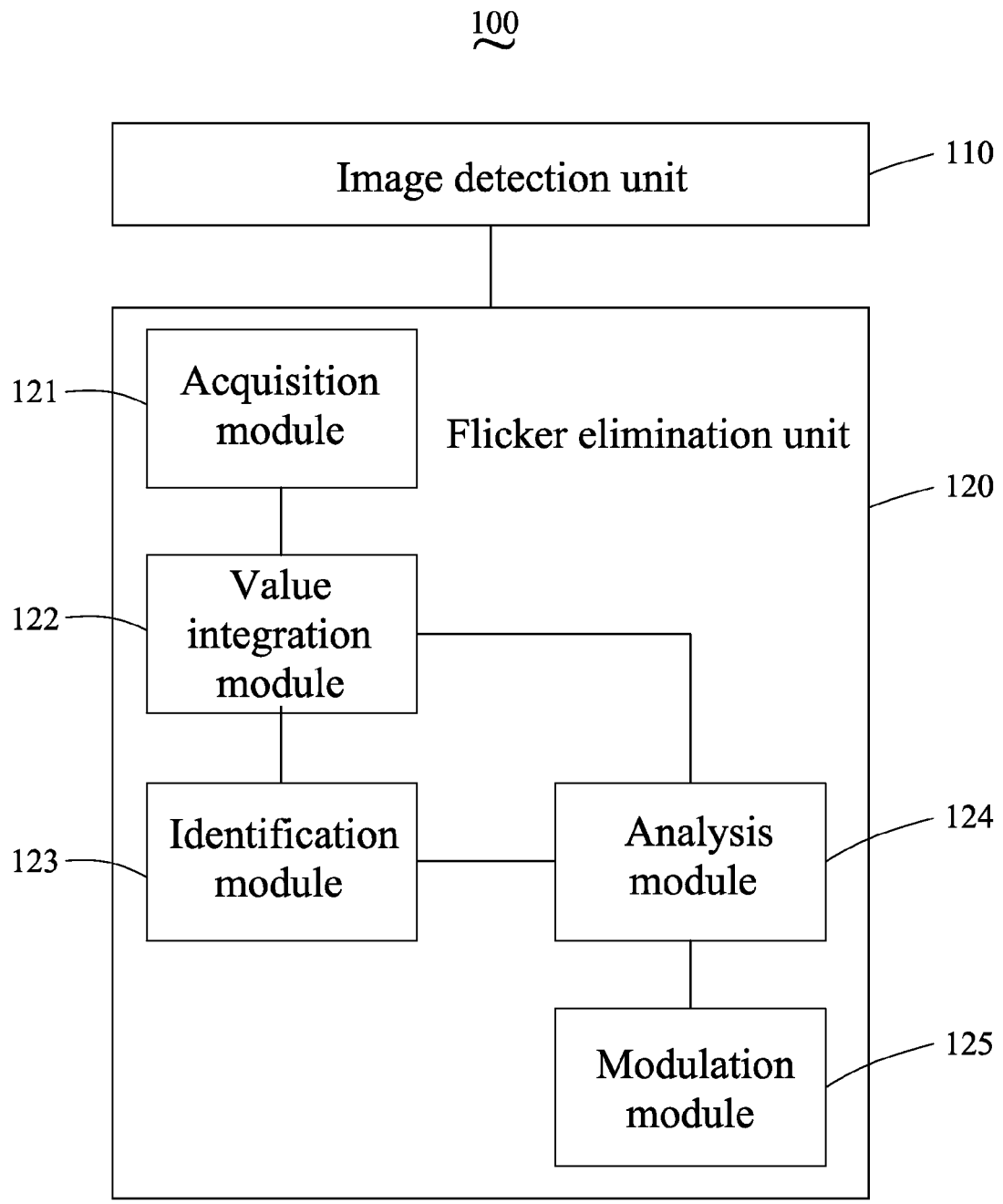
FIG. 1 is a functional block diagram of an image capture device including a value integration module, according to an exemplary embodiment.

Referring to FIG. 1, an image capture device 100, according to an exemplary embodiment, includes an image detection unit 110 and a flicker elimination unit 120. In this embodiment, the image capture device 100 is a digital still camera, although any other image capture device such as a cellular phone having a camera module is equally applicable while remaining well within the scope of the disclosure.

The image detection unit 110 is NTSC-compliant. When the image detection unit 110 is used with a 50 Hz power supply, and the exposure time of the image detection unit 110 is not equal to integer times of the cycle of ambient light brightness by a light source, flicker occurs in consecutive preview images generated by the image detection unit 110 (see FIG. 2).

The flicker elimination unit 120 includes an acquisition module 121, a value integration module 122, an identification module 123, an analysis module 124, and a modulation module 125.

The acquisition module 121 is configured for acquiring the exposure count of the preview images generated by the image detection unit 110. The exposure count conforms to the formula $EV=AV+TV=BV+SV$, wherein EV represents the exposure count, AV an aperture value, TV exposure time, BV brightness, and SV an automatic gain control (Agc) value. The AV, the TV, the BV and the SV can be regarded as parameters and changed with the EV.

The value integration module 122 is configured for receiving the exposure count and plotting the exposure count to form at least one waveform.

Figure 2:
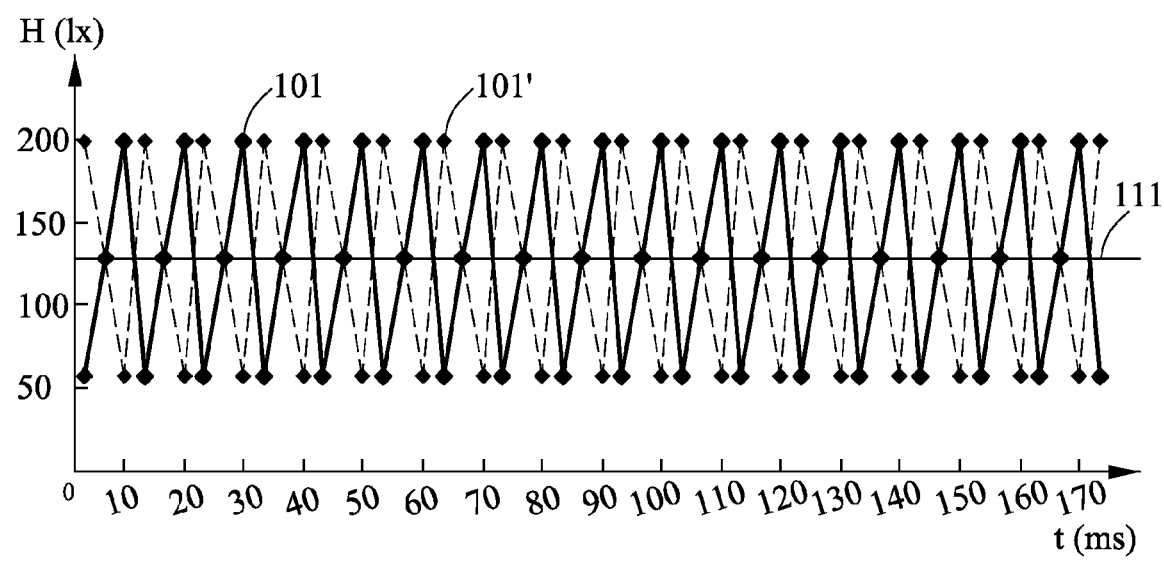
FIG. 2 is a waveform graph output by the value integration module of FIG. 1, illustrating the relationship between exposure of the preview images and preview time.
Figure 3:
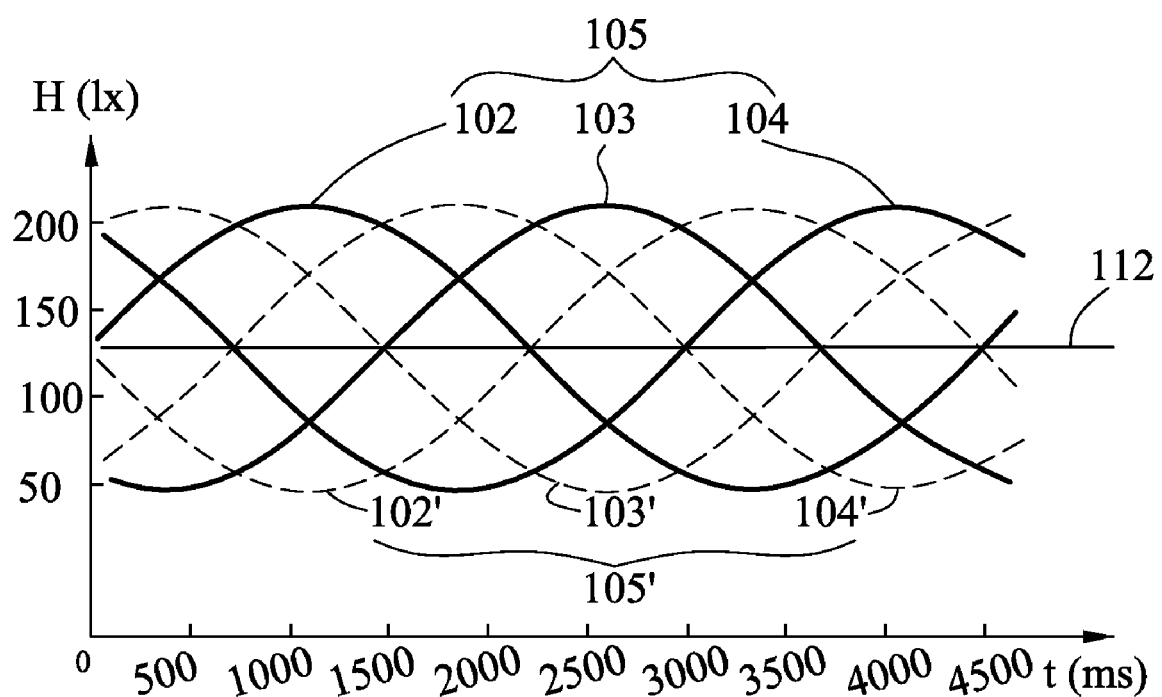
FIG. 3 is another waveform graph output by the value integration module of FIG. 1, also illustrating the relationship between exposure of the preview images and preview time.

If the image detection unit 110 functions precisely with a cycle period substantially equal to 33.33 ms, the exposure count will be plotted as a first waveform 101 shown in FIG. 2. However, if not, the cycle period may accordingly deviate from 33.33 ms. The exposure count is plotted as a second waveform 105 as shown in FIG. 3. In theory, the second waveform 105 can be discriminated into three sub-waveforms 102, 103, 104, all of which can be identified by the identification module 123 and analyzed by the analysis module 124.

Referring back to FIG. 1, the identification module 123 is configured for determining whether the exposure count is fluctuating, or in other words, whether a waveform is detected. If so, the preview images flicker and further analysis and modulation of the TV or the SV are required.

The analysis module 124 is configured for analyzing waveform components such as peak values, trough values, and amplitude values combining the two, to determine modulation of the TV or the SV. In this embodiment, half of the amplitude of the waveform is set as a standard value and the amplitude value represents the exposure count.

The modulation module 125 is configured for modulating parameters such as the SV or the TV to form a reverse waveform 101', in broken line, shown in FIG. 2, or reverse sub-waveforms 102', 103', 104' shown in FIG. 3, so as to smooth the original waveform 101 shown in FIG. 2, or the original waveforms 102, 103, 104 into straight lines 111 and 112, respectively.

Figure 4:
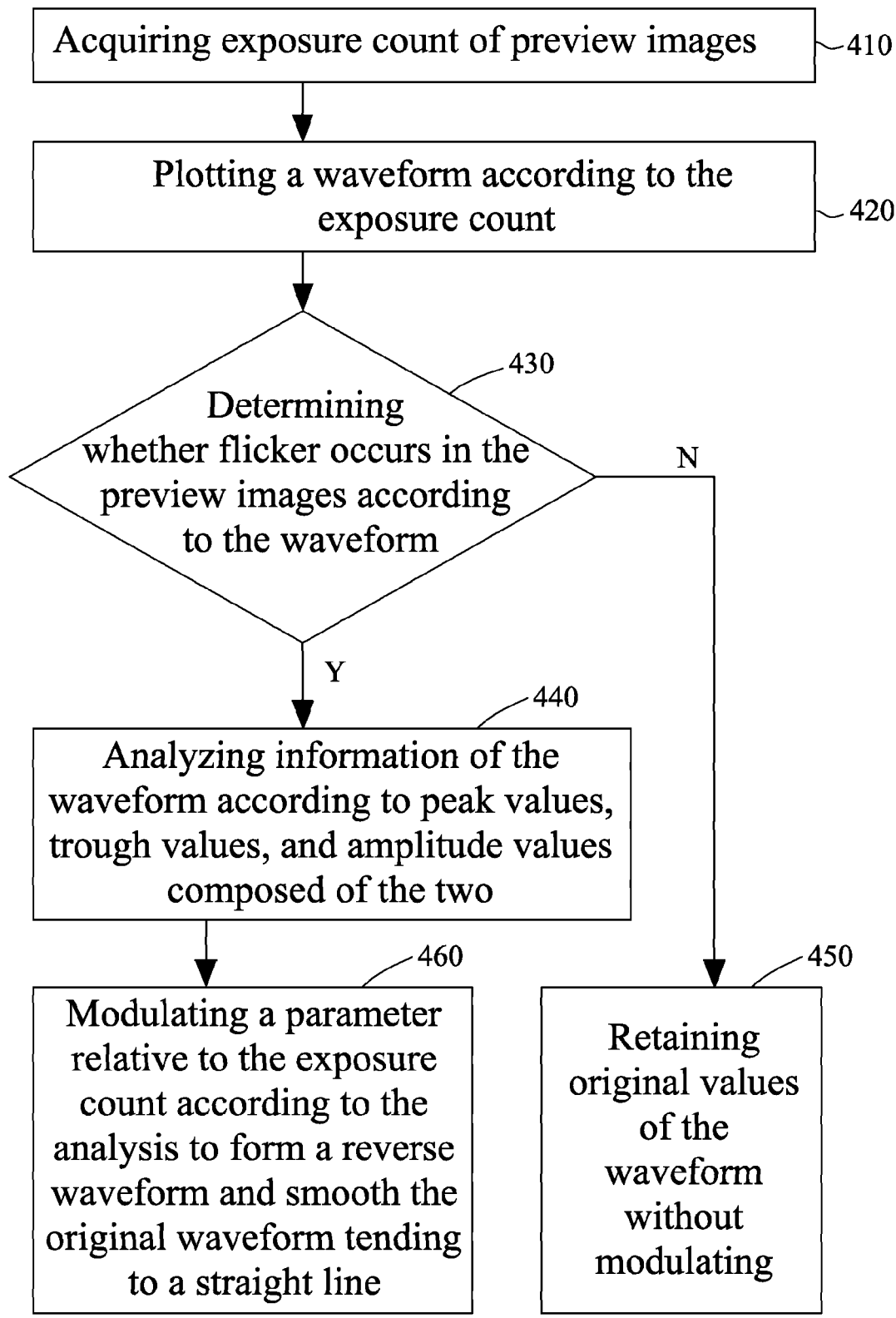
FIG. 4 is a flowchart of an image capture method, according to another exemplary embodiment.
Figure 5:
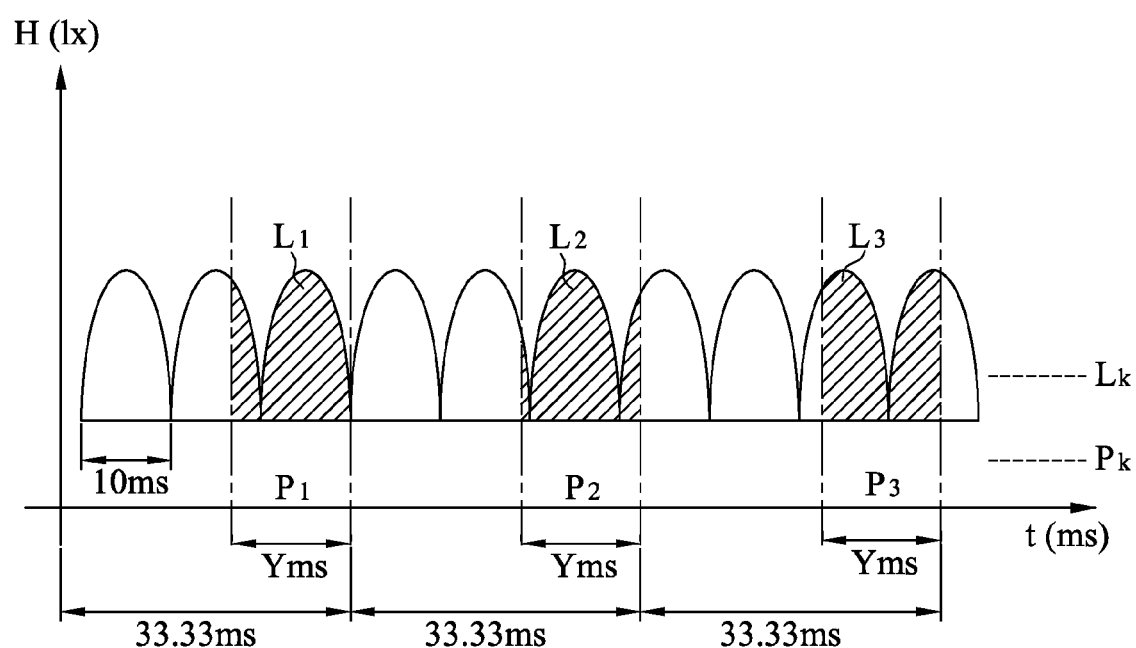
FIG. 5 is a graph illustrating autofocus of a related-art image capture device.

Referring to FIG. 4, an image capture method of the image capture device 100 is applicable when each cycle period of an image detection unit 110 is not an integer.

In step 410, exposure count of preview images is acquired. In this embodiment, the exposure count of the image detection unit 110 can be plotted by an acquisition module 121 and represented by the formula $EV=AV+TV=BV+SV$, wherein EV represents the exposure count, AV the aperture value, TV exposure time, BV brightness, and SV the Automatic gain control (Agc) value. Furthermore, the AV, the TV, the BV and the SV can be regarded as parameters and changed with the EV change.

In step 420, a first waveform 101 or a second waveform 105 (see FIGS. 2 and 3) is respectively plotted according to the exposure count. In general, the second waveform 105 can be discriminated into three sub-waveforms 102, 103, 104. In this embodiment, the horizontal axis and the vertical axis represent preview time (ms) and brightness (lx), respectively.

In step 430, it is determined whether flicker occurs in the preview images according to the first waveform 101 or the second waveform 105, in this embodiment, based on amplitude thereof. If the amplitude does not present as zero, flicker is determined to be present and step 440 is implemented. If the amplitude presents as zero, no flicker is present and step 450 is implemented.

In step 440, first waveform 101 or second waveform 105 is analyzed according to peak values, trough values, and amplitude values composed of the two. In this embodiment, half the amplitude is set as a standard value and the amplitude values represent the exposure count.

In step 450, original values of the waveform are retained without modulating.

In step 460, the parameter such as the SV or the TV value relative to the EV is modulated according to the analysis to form a first reverse waveform 101' and a second reverse waveform 105' composed of the sub-waveforms 102', 103', 104' to smooth the amplitude of the original waveform tending to straight lines 111, 112, respectively.

The image capture method of the image capture device 100 can modulate parameters such as SV or TV value according to the EV to produce the reverse waveform and thereby eliminate original waveform tending to the straight line, normalizing brightness of the preview images and eliminate flicker.

It will be understood that the above particular embodiments and methods are shown and described by way of illustration only. The principles and the features of the present invention may be employed in various and numerous embodiment thereof without departing from the scope of the invention as claimed. The above-described embodiments illustrate the scope of the invention but do not restrict the scope of the invention.

What is claimed is:

1. An image capture device, comprising:
an image detection unit configured for forming a plurality of consecutive preview images at a predetermined rate with a parameter of the image capture device; and
a flicker elimination unit configured for acquiring an exposure count of each of the preview images, plotting the exposure counts to form a waveform on the time axis, determining whether or not the waveform is fluctuating, analyzing information of the waveform to allow determination of modulation of the parameter if the waveform is fluctuating, and performing the modulation of the parameter to cause the parameter varying as a reverse waveform on the time axis that smoothes the amplitude of the waveform trending to a straight line according to the analyzing;
wherein the exposure count is represented by the formula:

$EV=AV+TV=BV+SV$ wherein EV represents the exposure count, AV represents an aperture value of the image capture device, TV represents an exposure time of the image capture device, BV represents a brightness value of each of the preview images, and SV represents an automatic gain control value of the image capture device.

2. The image capture device of claim 1, wherein the parameter is selected from the group consisting of: an exposure time, an aperture value, and an automatic gain control value of the image capture device.

3. The image capture device of claim 1, wherein the flicker elimination unit comprises:
an acquisition module capable of acquiring the exposure count of each of the preview images;
a value integration module capable of receiving the exposure counts and plotting the waveform;
an identification module configured for determining whether or not the waveform is fluctuating according to the information of the waveform;
an analysis module configured for analyzing the information of the waveform; and
a modulation module configured for modulating the parameter according to the information of the waveform to form the reverse waveform.

4. The image capture device of claim 1, wherein the information of the waveform comprises a peak value, a trough value, or an amplitude value of the waveform.

5. The image capture device of claim 4, wherein the identification module determines whether or not the waveform is fluctuating by detecting whether or not the amplitude of the waveform is zero, it is determined that the waveform is fluctuating when the amplitude of the waveform is not zero, and determines that the waveform if not fluctuating when the amplitude of the waveform is zero.

6. An image capture method of an image capture device, comprising:
acquiring an exposure count of each of a plurality of consecutive preview images by the image capture device;
plotting a waveform of the exposure counts on the time axis;
determining whether or not the waveform is fluctuating;
analyzing information of the waveform if the waveform is fluctuating; and
modulating a parameter of the image capture device according to the analyzing to form a reverse waveform of the parameter to eliminate the amplitude of the waveform;
wherein the exposure count is represented by the formula $EV=AV+TV=BV+SV$ wherein EV represents the exposure count, AV represents an aperture value of the image capture device, TV represents an exposure time of the image capture device, BV represents a brightness value of each of the preview images, and SV represents an automatic gain control value of the image capture device.

7. The image capture method of claim 6, further comprising remaining the waveform if the waveform is not fluctuating.

8. The image capture method of claim 6, wherein the information of the waveform comprises peak values, trough values, or amplitudes of the waveform.

9. The image capture method of claim 6, wherein the exposure counts are acquired under conditions of commercial light with a frequency of 50Hz.

10. The image capture method of claim 6, wherein the parameter is selected from the group consisting of the aperture value, the exposure time and the automatic gain control value.

* * * * *